United States Patent
Gonioukh et al.

(10) Patent No.: US 10,358,510 B2
(45) Date of Patent: Jul. 23, 2019

(54) HIGH-PRESSURE POLYMERIZATION PROCESS OF ETHYLENICALLY UNSATURATED MONOMERS IN A PRODUCTION LINE HAVING FLANGES COVERED BY A CHIMNEY CONSTRUCTION

(71) Applicant: Basell Polyolefine GmbH, Wesseling (DE)

(72) Inventors: Andrei Gonioukh, Erfstadt (DE); Thomas Herrmann, Cologne (DE); Dieter Littmann, Muecke (DE); Andre-Armand Finette, Cologne (DE); Sven Wolfram, Euskirchen (DE)

(73) Assignee: Basell Polyolefine GmbH, Wesseling (DE)

( * ) Notice: Subject to any disclaimer, the term of this patent is extended or adjusted under 35 U.S.C. 154(b) by 0 days.

(21) Appl. No.: 16/300,147

(22) PCT Filed: May 9, 2017

(86) PCT No.: PCT/EP2017/060977
§ 371 (c)(1),
(2) Date: Nov. 9, 2018

(87) PCT Pub. No.: WO2017/194494
PCT Pub. Date: Nov. 16, 2017

(65) Prior Publication Data
US 2019/0177447 A1    Jun. 13, 2019

(30) Foreign Application Priority Data
May 10, 2016   (EP) ..................... 16168992

(51) Int. Cl.
*C08F 10/02*       (2006.01)
*C08F 2/00*        (2006.01)
(Continued)

(52) U.S. Cl.
CPC ............. *C08F 10/02* (2013.01); *B01J 19/002* (2013.01); *B01J 19/0013* (2013.01); *B01J 19/06* (2013.01);
(Continued)

(58) Field of Classification Search
CPC .................................. C08F 2/01; C08F 2/34
(Continued)

(56) References Cited

U.S. PATENT DOCUMENTS

| | | |
|---|---|---|
| 4,921,918 A | 5/1990 | Pommier et al. |
| 7,192,561 B2 | 3/2007 | Groos et al. |

(Continued)

FOREIGN PATENT DOCUMENTS

| | | |
|---|---|---|
| CN | 86102488 A | 11/1986 |
| CN | 102686310 A | 9/2012 |

(Continued)

OTHER PUBLICATIONS

H. Bonsel and G. Luft, Chemie Ingenieur Technik, vol. 67, Issue 7, pp. 862-864, Jul. 1995.

(Continued)

*Primary Examiner* — Rip A Lee

(57) ABSTRACT

A process for polymerizing or copolymerizing ethylenically unsaturated monomers at pressures in the range of from 110 MPa to 500 MPa in a production line comprising a continuously operated polymerization reactor, wherein at least one of a pre-heater or pre-cooler, a polymerization reactor or a post reactor cooler is composed of tubes of a length from 5 m to 25 m which are flanged together, either directly or via bends, and the flanges are covered by a chimney construction, and wherein air is conveyed through the chimney construction and the air exiting the chimney construction is monitored with respect to the hydrocarbons concentration.

20 Claims, 3 Drawing Sheets

(51) Int. Cl.
    *B01J 19/06*     (2006.01)
    *B01J 19/24*     (2006.01)
    *B01J 19/00*     (2006.01)
    *C08F 2/01*     (2006.01)
    *C08F 2/34*     (2006.01)

(52) U.S. Cl.
    CPC .. *B01J 19/2415* (2013.01); *B01J 2219/00033* (2013.01); *B01J 2219/00092* (2013.01); *B01J 2219/00256* (2013.01); *C08F 2/01* (2013.01); *C08F 2/34* (2013.01)

(58) Field of Classification Search
    USPC ..................................... 526/64, 59, 60, 901
    See application file for complete search history.

(56) References Cited

U.S. PATENT DOCUMENTS

| | | | | |
|---|---|---|---|---|
| 8,187,546 | B2 * | 5/2012 | Barbero | B01J 3/008 |
| | | | | 422/131 |
| 9,273,162 | B2 * | 3/2016 | Weiand | C08F 10/02 |
| 9,441,057 | B1 * | 9/2016 | Littmann | C08F 110/02 |
| 9,631,035 | B2 * | 4/2017 | Groos | C08J 11/02 |
| 9,908,950 | B2 * | 3/2018 | Wolfram | B01J 19/0006 |
| 9,931,608 | B2 * | 4/2018 | Littmann | C08F 2/004 |
| 10,220,230 | B2 * | 3/2019 | Gueret | A62C 3/06 |
| 2003/0206835 | A1 * | 11/2003 | Donck | B01J 19/2415 |
| | | | | 422/132 |
| 2013/0274424 | A1 | 10/2013 | Weiand et al. | |
| 2014/0058050 | A1 * | 2/2014 | Tracht | B01J 19/0033 |
| | | | | 526/59 |
| 2014/0288248 | A1 * | 9/2014 | Berthalter | C08F 10/00 |
| | | | | 526/64 |
| 2017/0204207 | A1 | 7/2017 | Cornelissen et al. | |

FOREIGN PATENT DOCUMENTS

| | | | | |
|---|---|---|---|---|
| CN | 103691334 A | 4/2014 | | |
| CN | 103817120 A | 5/2014 | | |
| RU | 2575929 C2 | 2/2016 | | |
| WO | 02/01308 A2 | 1/2002 | | |
| WO | WO 2008/111755 | * | 9/2008 | ............. G08B 21/16 |
| WO | 2008/148758 A1 | 12/2008 | | |
| WO | 2012084772 A1 | 6/2012 | | |

OTHER PUBLICATIONS

The International Search Report and Written Opinion for PCT/EP2017/060977 dated Jul. 18, 2017.

* cited by examiner

HIGH-PRESSURE POLYMERIZATION PROCESS OF ETHYLENICALLY UNSATURATED MONOMERS IN A PRODUCTION LINE HAVING FLANGES COVERED BY A CHIMNEY CONSTRUCTION

This application is the U.S. National Phase of PCT International Application PCT/EP2017/060977, filed May 9, 2017, claiming benefit of priority to European Patent Application No. 16168992.2, filed May 10, 2016, the disclosures of which are incorporated herein by reference in their entirety.

FIELD OF THE INVENTION

The present disclosure provides a process for polymerizing or copolymerizing ethylenically unsaturated monomers at temperatures from 100° C. to 350° C. and pressures in the range of from 110 MPa to 500 MPa in a continuously operated polymerization reactor.

BACKGROUND OF THE INVENTION

Polyethylene is the most widely used commercial polymer and can be prepared by different processes. Polymerization in the presence of free-radical initiators at elevated pressures was the method first discovered to obtain polyethylene and continues to be a valued process, with high commercial relevance for the preparation of low density polyethylene (LDPE).

A common set-up of a production line for preparing low density polyethylene comprises a polymerization reactor which can be an autoclave or a tubular reactor or a combination of such reactors and equipment. For pressurizing the reaction components, a set of two compressors, a primary compressor and a secondary compressor, may be used. At the end of the polymerization sequence, a production line for high-pressure polymerization may further include apparatuses like extruders and granulators for pelletizing the resulting polymer. Furthermore, such a production line may also comprise means for feeding monomers and comonomers, free-radical initiators, modifiers or other substances at one or more positions to the polymerization reaction.

A characteristic of the radically initiated polymerization of ethylenically unsaturated monomers under high pressure is that the conversion of the monomers is often incomplete. For each pass of the reactor or the reactor combination, only about 10% to 50% of the dosed monomers are converted in the case of a polymerization in a tubular reactor, and from 8% to 30% of the dosed monomers are converted in the case of a polymerization in an autoclave reactor. The resulting reaction mixture often leaves the reactor through a pressure control valve and may then be separated into polymeric and gaseous components with the unreacted monomers being recycled. To avoid unnecessary decompression and compression steps, the separation into polymeric and gaseous components can be carried out in at least two stages. The monomer-polymer mixture leaving the reactor is usually transferred to a first separating vessel, frequently called high-pressure product separator, in which the separation in polymeric and gaseous components is carried out at a pressure that allows for recycling the ethylene and comonomers separated from the monomer-polymer mixture to the reaction mixture at a position between the primary compressor and the secondary compressor. At the conditions of operating the first separation vessel, the polymeric components within the separating vessel are in liquid state. The liquid phase obtained in the first separating vessel is transferred to a second separation vessel, frequently called low-pressure product separator, in which a further separation in polymeric and gaseous components takes place at lower pressure. The ethylene and comonomers separated from the mixture in the second separation vessel are fed to the primary compressor where they are compressed to the pressure of the fresh ethylene feed, combined with the fresh ethylene feed and the joined streams are further pressurized to the pressure of the high-pressure gas recycle stream.

The polymerization process in a LDPE reactor is carried out at high pressures which can reach 350 MPa. Such high pressure may require special technology for the process to be handled in a safe and reliable manner. Technical issues in handling ethylene at high pressures are, for example, described in Chem. Ing. Tech. 67 (1995), pages 862 to 864. It is stated that ethylene decomposes rapidly in an explosive manner under certain temperature and pressure conditions to give soot, methane and hydrogen. This undesired reaction occurs repeatedly in the high-pressure polymerization of ethylene. The drastic increase in pressure and temperature associated therewith represents a considerable potential risk for the operational safety of the production plants.

A possible solution for preventing a drastic increase in pressure and temperature of this type involves installing rupture discs or emergency pressure-relief valves. WO 02/01308 A2, for example, discloses a specific hydraulically controlled pressure relief valve which allows a particularly fast opening of the pressure relief valve in case of sudden changes in pressure or temperature. It is technically possible to handle such thermal runaways or explosive decompositions of ethylene within the polymerization reactor, however these situations are highly undesirable since thermal runaways or explosive decompositions of ethylene within the polymerization reactor lead to a shut-down of the polymerization plant with frequent emission of ethylene into the environment and loss of production.

Another threat to the operational safety of high-pressure polymerization plants is the occurrence of leaks. Due to the high pressure difference between the interior of the polymerization reactor and the surrounding, even small fissures in a wall of high-pressure equipment may lead to an exit of a considerably high amount of the reactor content resulting in locally high concentrations of combustible hydrocarbons in a short time period. On the other hand, in case of larger leaks, the available time for reacting is extremely short.

Processes for polymerizing or copolymerizing ethylenically unsaturated monomers at pressures in the range of from 110 MPa to 500 MPa places specific demands on a reliable detection of combustible or explosive gases, which may leak from the polymerization equipment. Depending on the size and the position of the leak, the leakage rate may be extremely high or relatively low, with a risk of an accumulation of the leaked material. The leaked material may have a temperature in the range from 100° C. to 350° C. but can also be cold and may therefore sink to the ground and accumulate there. The concentration of leaked gas in a certain volume element in the vicinity of the polymerization plant can vary from substantially pure hydrocarbon to a very low concentration of combustible gas in air. Furthermore, the leakage can not only take place towards the atmosphere but can also occur at a section of the equipment which is covered by a cooling or heating jacket. Moreover, as such processes are not carried out in totally closed housings, also weather phenomena such as wind and rain may have an influence on the detection of leaked gases.

Another difficulty with respect to processes for preparing ethylene polymers at high pressure is that the reaction mixture is a supercritical composition comprising monomer and polymer. After a leakage of such a reaction mixture into the atmosphere, small polymer particles are formed which are subject to electrostatic charging. Consequently, there is an enhanced probability for an ignition after an explosive gas cloud has developed after an escape of reaction mixture.

WO 2008/148758 A1 discloses a method of operating a high-pressure ethylene polymerization unit comprising a tubular reactor equipped with a cooling jacket, in which method the leakage of reaction mixture into the cooling jacket is controlled by monitoring the electrical conductivity of the aqueous cooling medium. Such a method however requires that at least one of the chemical substances in the reaction mixture changes the electrical conductivity of the aqueous cooling medium and furthermore can only detect leakage at positions of the polymerization equipment which are covered by a cooling jacket.

The polymerization of ethylenically unsaturated monomers at pressures in the range of from 110 MPa to 500 MPa can be carried out in tubular polymerization reactors because these reactors have a high surface for removing the liberated heat of polymerization. Tubular reactors may have a length in the range from about 0.5 km to 5 km and are composed of thick-walled tubes of a length from 5 m to 25 m. The individual tubes of the tubular reactor are flanged together, either directly or via bends. Also, pre-heaters or pre-coolers or post reactor coolers in production lines for preparing low density polyethylenes may be composed of thick-walled tubes of a length from 5 m to 25 m, which are flanged together. Among the parts of a low density polyethylene production line which have a relatively high likelihood of a leakage are these flange connections because these sometimes need to be loosened and retightened for maintenance reasons. However, the leaking rate for a leakage at a flange connection may be relatively small and makes it difficult to quickly recognize the occurrence of such a leak.

Accordingly there is a need to overcome these and other disadvantages and provide a process which allows for a fast recognition of a leakage in a flange of a production line for polymerizing ethylenically unsaturated monomers at pressures in the range of from 110 MPa to 500 MPa.

SUMMARY OF THE INVENTION

The present disclosure provides a process for polymerizing or copolymerizing one or more ethylenically unsaturated monomers at temperatures from 100° C. to 350° C. and pressures in the range of from 110 MPa to 500 MPa in a continuously operated polymerization reactor,
wherein the polymerization is carried out in a production line in which the monomers are brought to the polymerization pressure by one or more compressors in a sequence of compression stages in which the compressed gas mixture is cooled after each compression stage by a compression stage cooler, the compressed monomers are optionally passed through a pre-heater or a pre-cooler and transferred into the polymerization reactor which is optionally cooled by cooling jackets, a reaction mixture obtained by the polymerization leaves the reactor through a pressure control valve and is optionally cooled by an post reactor cooler, the reaction mixture is then separated into polymeric and gaseous components in two or more stages, where the gaseous components separated off in a first stage at an absolute pressure of from 15 MPa to 50 MPa are recycled to the one or more compressors via a high-pressure gas recycle line, and the gaseous components separated off in a second stage at an absolute pressure in the range of from 0.1 to 0.5 MPa are recycled to the first stage of the sequence of compression stages via a low-pressure gas recycle line, and the polymeric components obtained by the polymerization are transformed into pellets,
wherein at least one of the pre-heater or pre-cooler, the polymerization reactor and the post reactor cooler is composed of tubes of a length from 5 m to 25 m which are flanged together, either directly or via bends, and the flanges are covered by a chimney construction, and wherein air is conveyed through the chimney construction and the air exiting the chimney construction is monitored with respect to the hydrocarbon concentration.

In some embodiments, the polymerization reactor is a tubular reactor or a reactor cascade comprising a tubular reactor and the production line comprises a pre-heater and a post reactor cooler, and
the pre-heater, the polymerization reactor and the post reactor cooler are composed of tubes of a length from 5 m to 25 m which are flanged together, either directly or via bends, and the flanges are covered by a chimney construction, and air is conveyed through the chimney construction, and the air exiting the chimney construction is monitored with respect to the hydrocarbons concentration.

In some embodiments, the polymerization reactor is an autoclave reactor or a cascade of autoclave reactors and the production line comprises a pre-cooler or a post reactor cooler or a pre-cooler and a post reactor cooler, and
the pre-cooler or the post reactor cooler or the pre-cooler and the post reactor cooler are composed of tubes of a length from 5 m to 25 m which are flanged together, either directly or via bends, and the flanges are covered by a chimney construction, and air is conveyed through the chimney construction, and the air exiting the chimney construction is monitored with respect to the hydrocarbons concentration.

In some embodiments, at least 50% of the chimney constructions cover two or more flanges.

In some embodiments, the chimney construction has openings at the bottom and at the top and the air is conveyed by natural convection.

In some embodiments, the air exiting a chimney construction is monitored by one or more IR open path detectors or by an IR point detector.

In some embodiments, the air exiting a chimney construction is monitored by an array of IR open path detectors which operate according to a voting logic.

In some embodiments, an emergency pressure release program is automatically started when hydrocarbons are detected in the air exiting the chimney construction.

In some embodiments, further measurements for detecting a leakage of hydrocarbons in the surrounding of the production line are carried out.

In some embodiments, an emergency pressure release program is automatically started when hydrocarbons are detected in the air exiting the chimney construction or a leakage of hydrocarbons in the surrounding of the production line is detected by the further measurements.

In some embodiments, the further measurements for detecting a leakage of hydrocarbons in the surrounding of the production line are carried out by employing IR open path detectors, IR point detector or ultrasonic detectors, or combinations thereof.

In some embodiments, the further measurements for detecting a leakage of hydrocarbons in the surrounding of the production line include a monitoring of at least one of the cooling media which cool the compression stage coolers, the cooling jackets of the polymerization reactor, the post reactor cooler or a cooler within the high-pressure gas recycle line with respect to an occurrence of a leakage of monomers or of reaction mixture into the cooling medium.

In some embodiments, air is passed through the cooling medium and thereafter conveyed to an IR point detector capable of detecting hydrocarbons.

In some embodiments, the polymerization reactor and optionally further parts of the production line are installed within a protective enclosure and wherein a water based deluge system is started automatically in parallel with the emergency pressure release program, and the water based deluge system provides droplets of a diameter in a range from 25 μm to 20 mm to the enclosed area when a leakage of monomers or of reaction mixture is detected and the droplets are provided with a minimum flow rate of 10 L/min per m$^2$ of enclosed area.

In some embodiments, a steam based deluge system is started automatically in parallel with the emergency pressure release program.

DETAILED DESCRIPTION OF THE INVENTION

Figure 1:
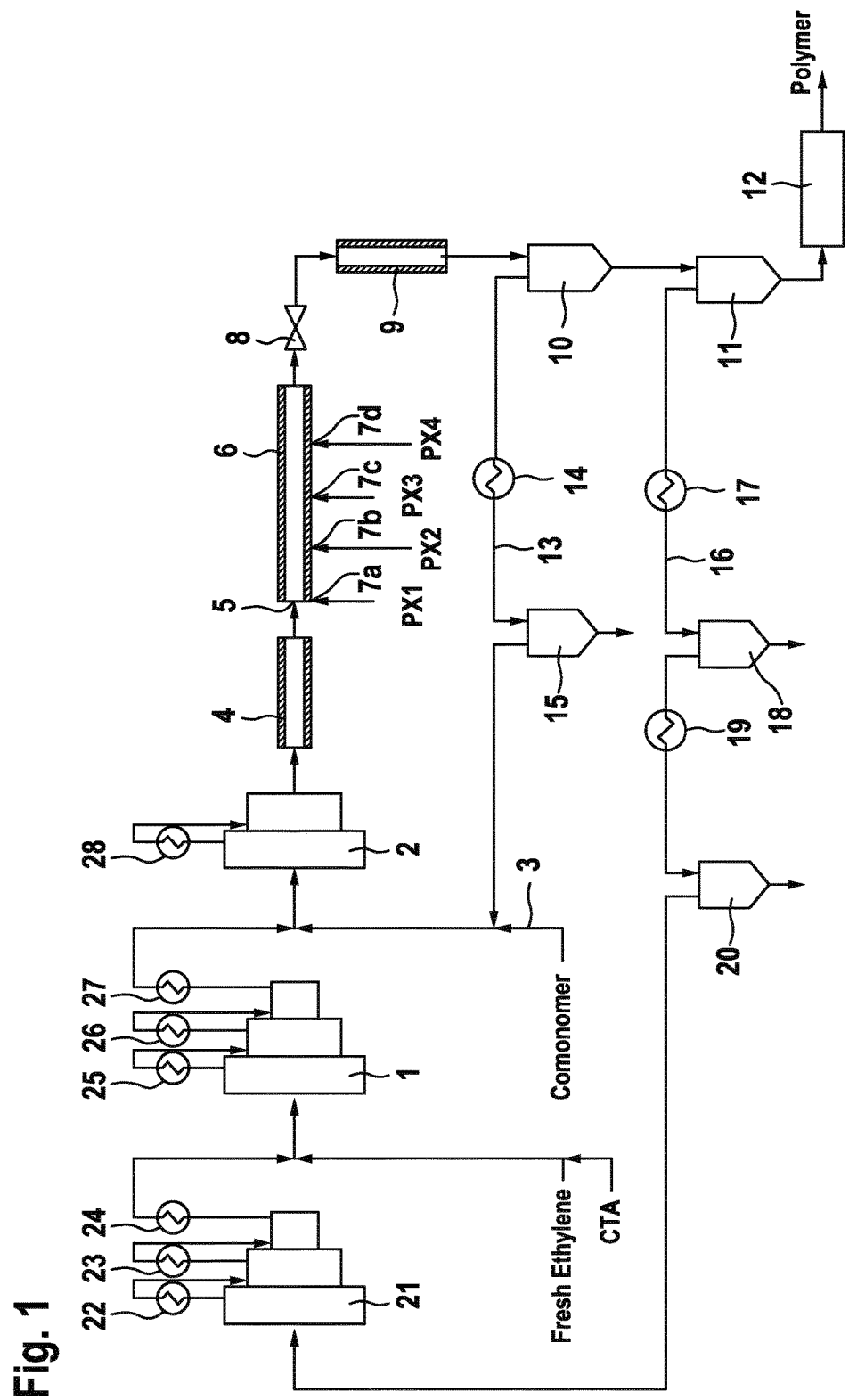
FIG. 1 shows schematically a typical set-up for a production for carrying out the process of the present disclosure.

The covering of the flanges of a production line for polymerizing ethylenically unsaturated monomers at pressures in the range of from 110 MPa to 500 MPa by a chimney construction allows for fast and reliable detection of a hydrocarbon leakage through flanges because leaking gas is confined to the volume within the chimney construction and a concentration above the detection limit will be reached more quickly than without the chimney construction.

The present disclosure refers to a process for polymerizing or copolymerizing ethylenically unsaturated monomers in a continuously operated polymerization reactor, which can also be a combination of polymerization reactors, at temperatures from 100° C. to 350° C. and pressures in the range of from 110 MPa to 500 MPa. The present disclosure relates to such a process, in which the polymerization is carried out in a production line, in which the monomers are brought to the polymerization pressure by one or more compressors in a sequence of compression stages, in which the compressed gas mixture is cooled after each compression stage by a compression stage cooler, the compressed monomers are optionally passed through a pre-heater or a pre-cooler and transferred into the polymerization reactor, which is optionally cooled by cooling jackets, a reaction mixture obtained by the polymerization is leaving the reactor through a pressure control valve and optionally cooled by an post reactor cooler, the reaction mixture is separated into polymeric and gaseous components in two or more stages, where the gaseous components separated off in a first stage at an absolute pressure of from 15 MPa to 50 MPa are recycled to the one or more compressors via a high-pressure gas recycle line, and the gaseous components separated off in a second stage at an absolute pressure in the range of from 0.1 to 0.5 MPa are recycled to the first stage of the sequence of compression stages via a low-pressure gas recycle line, and the polymeric components obtained by the polymerization are transformed into pellets.

The high-pressure polymerization may be a homopolymerization of ethylene or a copolymerization of ethylene with one or more other monomers, provided that these monomers are free-radically copolymerizable with ethylene under high pressure. Examples of copolymerizable monomers for use in the present technology are α,β-unsaturated $C_3$-$C_8$-carboxylic acids, such as maleic acid, fumaric acid, itaconic acid, acrylic acid, methacrylic acid and crotonic acid, derivatives of α,β-unsaturated $C_3$-$C_8$-carboxylic acids, e.g. unsaturated $C_3$-$C_{15}$-carboxylic esters, in particular esters of $C_1$-$C_6$-alkanols, or anhydrides, including methyl methacrylate, ethyl methacrylate, n-butyl methacrylate or tert-butyl methacrylate, methyl acrylate, ethyl acrylate, n-butyl acrylate, 2-ethylhexyl acrylate, tert-butyl acrylate, methacrylic anhydride, maleic anhydride or itaconic anhydride, and 1-olefins such as propene, 1-butene, 1-pentene, 1-hexene, 1-octene or 1-decene. In addition, vinyl carboxylates, such as vinyl acetate, can be used as comonomers. Propene, 1-butene, 1-hexene, acrylic acid, n-butyl acrylate, tert-butyl acrylate, 2-ethylhexyl acrylate, vinyl acetate or vinyl propionate may also be as comonomers.

In the case of copolymerization, the proportion of comonomer or comonomers in the reaction mixture is from 1 to 50% by weight, such as from 3 to 40% by weight, based on the amount of monomers, i.e. the sum of ethylene and other monomers. Depending on the type of comonomer, tone may feed the comonomers at more than one point of the reactor set-up. In certain embodiments, the comonomers are fed to the suction side of the secondary compressor.

For the purposes of the present disclosure, polymers or polymeric materials are substances which are made up of at least two monomer units. The polymers or polymeric materials are, in some embodiments, low density polyethylenes having an average molecular weight $M_n$ of more than 20 000 g/mole. The term "low density polyethylene" includes ethylene homopolymers and ethylene copolymers. The process of the present disclosure can also be employed in the preparation of oligomers, waxes and polymers having a molecular weight $M_n$ of less than 20 000 g/mole.

The process of the present disclosure, in some embodiments, relates to a radical polymerization carried out in the presence of free-radical polymerization initiators. Possible initiators for starting the polymerization in the respective reaction zones may include substances that can produce radical species under the conditions in the polymerization reactor, for example, oxygen, air, azo compounds or peroxidic polymerization initiators. In one embodiment of the disclosure, the polymerizations are carried out by using oxygen, either fed in the form of pure $O_2$ or as air. In case of initiating the polymerization with oxygen, the initiator may be first mixed with the ethylene feed and then fed to the reactor. In such a case, it is not only possible to feed a stream comprising monomer and oxygen to the beginning of the polymerization reactor but also to one or more points along the reactor, creating two or more reaction zones. Initiation using organic peroxides or azo compounds represent further embodiments of the present disclosure. Examples of organic peroxides for use in the present disclosure are peroxy esters, peroxy ketals, peroxy ketones and peroxycarbonates, e.g. di(2-ethylhexyl) peroxydicarbonate, dicyclohexyl peroxydicarbonate, diacetyl peroxydicarbonate, tert-butyl peroxyisopropylcarbonate, di-sec-butyl peroxydicarbonate, di-tert-butyl peroxide, di-tert-amyl peroxide, dicumyl peroxide, 2,5-dimethyl-2,5-di-tert-butylperoxyhexane, tert-butyl cumyl peroxide, 2,5-dimethyl-2,5-di(tert-butylperoxy)hex-3-yne, 1,3-diisopropyl monohydroperoxide or tert-butyl hydroperoxide, didecanoyl peroxide, 2,5-dimethyl-2,5-di(2-ethylhexanoylperoxy)hexane, tert-amyl peroxy-2-ethylhexanoate, dibenzoyl peroxide, tert-butyl peroxy-2-ethylhexanoate, tert-butyl peroxydiethylacetate, tert-butyl peroxydiethylisobutyrate, tert-butyl peroxy-3,5,5-trimethylhexanoate, 1,1-di(tert-butylperoxy)-3,3,5-trimethylcyclohexane, 1,1-di(tert-butylperoxy)cyclohexane, tert-butyl peroxyacetate, cumyl peroxyneodecanoate, tert-amyl peroxyneodecanoate, tert-amyl peroxypivalate, tert-butyl peroxyneodecanoate, tert-butyl permaleate, tert-butyl peroxypivalate, tert-butyl peroxyisononanoate, diisopropylbenzene hydroperoxide, cumene hydroperoxide, tert-butyl peroxybenzoate, methyl isobutyl ketone hydroperoxide, 3,6,9-trimethyl-3,6,9-trimethyl-triperoxocyclononane and 2,2-di(tert-butylperoxy)butane. Azoalkanes (diazenes), azodicarboxylic esters, azodicarboxylic dinitriles such as azobisisobutyronitrile and hydrocarbons which decompose into free radicals and are also referred as C—C initiators, e.g. 1,2-diphenyl-1,2-dimethylethane derivatives and 1,1,2,2-tetramethylethane derivatives, may also be used. It is possible to use either individual initiators or mixtures of various initiators. A large range of initiators, including peroxides, are commercially available, for example the products of Akzo Nobel offered under the trade names Trigonox® or Perkadox®.

Peroxidic polymerization initiators for use in the present technology include, for example, 1,1-di(tert-butylperoxy) cyclohexane, 2,2-di(tert-butylperoxy)butane, tert-butyl peroxy-3,5,5-trimethylhexanoate, tert-butyl peroxybenzoate, 2,5-dimethyl-2,5-di(tert-butylperoxy)hexane, tert-butyl cumyl peroxide, di-tert-butyl peroxide and 2,5-dimethyl-2,5-di(tert-butylperoxy)hex-3-yne, and, di-(2-ethylhexyl)peroxydicarbonate or tert-butyl peroxy-2-ethylhexanoate.

The initiators can be employed individually or as a mixture in concentrations of from 0.1 mol/t to 50 mol/t of polyethylene produced, such as from 0.2 mol/t to 20 mol/t, in each reaction zone. In one embodiment of the present disclosure, the free-radical polymerization initiator, which is fed to a reaction zone, is a mixture of at least two different azo compounds or organic peroxides. If such initiator mixtures are used, in some embodiments these are fed to all reaction zones. There is no limit for the number of different initiators in such a mixture, however in some embodiments the mixtures are composed of from two to six, including two, three or four different initiators. Mixtures of initiators which have different decomposition temperatures may be used in accordance with the present technology.

In some embodiments, the initiators may be used in a dissolved state. Examples of solvents for use with the initiators are ketones and aliphatic hydrocarbons, including octane, decane, isododecane and other saturated $C_8$-$C_{25}$-hydrocarbons. The solutions may comprise the initiators or initiator mixtures in proportions of from 2 to 65% by weight, such as from 5 to 40% by weight and from 8 to 30% by weight.

In the high-pressure polymerization, the molecular weight of the polymers to be prepared can be altered by the addition of modifiers which act as chain-transfers agents. Examples of modifiers are hydrogen, aliphatic and olefinic hydrocarbons, e.g. propane, butane, pentane, hexane, cyclohexane, propene, 1-butene, 1-pentene or 1-hexene, ketones such as acetone, methyl ethyl ketone (2-butanone), methyl isobutyl ketone, methyl isoamyl ketone, diethyl ketone or diamyl ketone, aldehydes such as formaldehyde, acetaldehyde or propionaldehyde and saturated aliphatic alcohols such as methanol, ethanol, propanol, isopropanol or butanol. In some embodiments, the present technology uses saturated aliphatic aldehydes, such as propionaldehyde or 1-olefins such as propene, 1-butene or 1-hexene, or aliphatic hydrocarbons such as propane.

The high-pressure polymerization is, in some embodiments, carried out at pressures of from 110 MPa to 500 MPa, such as from 160 MPa to 350 MPa and from 200 MPa to 330 MPa for polymerization in a tubular reactor; and pressures of from 110 MPa to 300 MPa and from 120 MPa to 280 MPa for polymerization in an autoclave reactor. The polymerization temperatures are in the range of from 100° C. to 350° C., including from 180° C. to 340° C. and from 200° C. to 330° C. for polymerization in a tubular reactor; and from 110° C. to 320° C. and from 120° C. to 310° C. for polymerization in an autoclave reactor.

The polymerization can be carried out with all types of high-pressure reactors appropriate for high-pressure polymerization. High-pressure reactors are, in non-limiting examples, tubular reactors or autoclave reactors. In certain embodiments, the polymerization is carried out in one or more tubular reactors or one or more autoclave reactors or combinations of such reactors. In some embodiments of the present disclosure, the polymerization reactor is a tubular reactor.

Common high-pressure autoclave reactors are stirred reactors and have a length-to-diameter ratio of in the range from 2 to 30, such as from 2 to 20. Such autoclave reactors have one or more reaction zones, including from 1 to 6 reaction zones and from 1 to 4 reaction zones. The number of reaction zones depends from the number of agitator baffles which separate individual mixed zones within the autoclave reactor. In production lines in which the polymerization or the first polymerization is carried out in an autoclave reactor, i.e. in production lines in which the only polymerization reactor is an autoclave reactor or in production lines in which the first reactor of a reactor cascade is an autoclave reactor, the reaction mixture coming from the compressors may first be passed through a pre-cooler before entering the autoclave reactor.

Appropriate tubular reactors are basically long, thick-walled pipes, which may be from about 0.5 km to 4 km, including from 1 km to 3 km and from 1.5 km to 2.5 km long. The inner diameter of the pipes may be in the range of from about 30 mm to 120 mm and from 60 mm to 100 mm. Such tubular reactors may have a length-to-diameter ratio of greater than 1000, such as from 10000 to 40000 and from 25000 to 35000. In some embodiments, the tubular reactor is composed of tubes of a length from 5 m to 25 m, from 10 m to 22 m, and from 15 m to 20 m. The individual tubes of the tubular reactor may be flanged together. The tube can also be flanged to a bend, such as to a 180° bend. Such 180° bends may have a small radius, i.e. a ratio R/do of 4 or less, with "R" being the radius of curvature of the bending and "do" being the outer diameter of the tube, for saving space. In one embodiment of the present disclosure, the flanges are arranged such that groups of flanges are aligned on top of each other. In some embodiments, such a group of flanges arranged one atop of the other has at least two flanges, including from 3 to 100 flanges and from 5 to 60 flanges.

In some embodiments, the tubular reactors of the present disclosure have at least two reaction zones, including from 2 to 6 reaction zones and from 2 to 5 reaction zones. The number of reaction zones is given by the number of feeding points for the initiator. Such a feeding point can, for example, be an injection point for a solution of azo compounds or organic peroxides. Fresh initiator is added to the reactor, where the initiator decomposes into free radicals and initiates further polymerization. The generated heat of the reaction raises the temperature of the reaction mixture, since more heat is generated than can be removed through the walls of the tubular reactor. The rising temperature increases the rate of decomposition of the free-radical initiators and accelerates polymerization until essentially all of the free-radical initiator is consumed. Thereafter, no further heat is typically generated and the temperature decreases again since the temperature of the reactor walls is lower than that of the reaction mixture. Accordingly, the part of the tubular reactor downstream of an initiator feeding point in which the temperature rises is the reaction zone, while the part thereafter, in which the temperature decreases again, is predominantly a cooling zone. The amount and nature of added free-radical initiators determines how much the temperature rises. In some embodiments, the temperature rise is set to be in the range of from 70° C. to 170° C. in the first reaction zone and 50° C. to 130° C. for the subsequent reaction zones, depending on the product specifications and the reactor configuration. In further embodiments, the tubular reactor is equipped with cooling jackets for removing the heat of the reaction. In additional embodiments, all reaction zones of the tubular reactor are cooled by cooling jackets.

The compression of the reaction gas composition to the polymerization pressure is carried out by one or more compressors in a sequence of compression stages, where a primary compressor may first compress the reaction gas composition to a pressure of from 10 MPa to 50 MPa and a secondary compressor, which is sometimes designated as hyper compressor, further compresses the reaction gas composition to the polymerization pressure of from 110 MPa to 500 MPa. In some embodiments, the primary compressor and the secondary compressor are multistage compressors. It is further possible to separate one or more stages of one or both of these compressors and divide the stages into separated compressors. However, a series of one primary compressor and one secondary compressor may be used for compressing the reaction gas composition to the polymerization pressure. In such cases, sometimes the whole primary compressor is designated as primary compressor. However, it is also common to designate the one or more first stages of the primary compressor, which compress the recycle gas from the low-pressure product separator to the pressure of the fresh ethylene feed, as the booster compressor and then the one or more subsequent stages may be regarded as the primary compressor, although the booster compressor and the subsequent stages are all part of one apparatus. After each of the compression stages, the compressed gas mixture is cooled by a compression stage cooler to remove the heat of compression. In some embodiments, the compression stage coolers are operated in way that the temperature of the compressed gas mixtures stays below 130° C.

In one embodiment of the present disclosure, the production line comprises a pre-heater upstream of a tubular reactor for heating the reaction gas composition to a temperature capable of initiating the polymerization. The pre-heater may be composed of tubes of a length from 5 m to 25 m, including a length from 10 m to 22 m and from 15 m to 20 m. The individual tubes of the pre-heater may be flanged together. The tubes can also be flanged to a bend such as a 180° bend. Such 180° bends often have a small radius, i.e. a ratio R/do of 4 or less. In one embodiment of the present disclosure, the flanges are arranged such that groups of flanges are aligned on top of each other. In certain embodiments, such a group of flanges arranged one atop of the other has at least two flanges, such as from 3 to 50 flanges and from 5 to 30 flanges.

In one embodiment of the present disclosure, the entire reaction gas composition provided by the secondary compressor is fed via a pre-heater to the inlet of the tubular reactor. In another embodiment of the present disclosure, only a part of the reaction gas composition compressed by the secondary compressor is fed via the pre-heater to the inlet of the tubular reactor, and the remainder of the reaction gas composition compressed by the secondary compressor is fed as one or more side streams to the tubular reactor downstream of the inlet of the tubular reactor. In such a set-up, in some embodiments from 30 to 90% by weight, such as from 40 to 70% by weight of the reaction gas composition provided by the secondary compressor, are fed to the inlet of the tubular reactor and from 10 to 70% by weight, more preferably from 30 to 60% by weight, of the reaction gas composition provided by the secondary compressor are fed as one or more side streams to the tubular reactor downstream of the inlet of the tubular reactor.

The production line for carrying out the polymerization of the present disclosure comprises, beside the polymerization reactor, two or more gas recycle lines for recycling unreacted monomers to the polymerization process. The reaction mixture obtained in the polymerization reactor is transferred to a first separation vessel, which may be called high-pressure product separator, and separated into a gaseous fraction and a liquid fraction at an absolute pressure of from 15 MPa to 50 MPa. The gaseous fraction withdrawn from the first separation vessel is fed via a high-pressure gas recycle line to the suction side of the secondary compressor. In the high-pressure gas recycle line, the gas may be purified by several purifications steps from undesired components such as entrained polymer or oligomers. The liquid fraction withdrawn from the first separation vessel, which may still comprise dissolved monomers such as ethylene and comonomers in an amount of 20 to 40% of weight, is transferred to a second separation vessel, known as a low-pressure product separator, and further separated, at reduced pressure, in some embodiments at an absolute pressure in the range of from 0.1 to 0.5 MPa, in polymeric and gaseous components. The gaseous fraction withdrawn from the second separation vessel is fed via a so called low-pressure gas recycle line to the primary compressor, which may be to the foremost of the stages. Also, the low-pressure gas recycle line may comprise several purifications steps for purifying the gas from undesired components. The production line can further comprise additional separation steps for separating reaction mixtures into gaseous and fractions and additional gas recycle lines for feeding unreacted monomers to one of the compressors, for example, in-between the first and the second separation step operating at an intermediate pressure.

In some embodiments, the recycled gas coming from the low-pressure gas recycle line is compressed by the first stages of the primary compressor to the pressure of the fresh feed of ethylenically unsaturated monomers, such as ethylene, thereafter combined with the fresh gas feed and the combined gases are further compressed in the primary compressor to the pressure of from 10 MPa to 50 MPa. In some embodiments, the primary compressor comprises five or six compression stages, two or three before adding the fresh gas and two or three after adding the fresh gas. The secondary compressor may have two stages; a first stage, which compresses the gas from about 30 MPa to about 120 MPa, and a second stage, which further compresses the gas from about 120 MPa to the final polymerization pressure.

The pressure within the polymerization reactor may be controlled by a pressure control valve, which can be arranged at the outlet of the polymerization reactor and through which the reaction mixture leaves the reactor. The pressure control valve can be any valve arrangement which is suitable for letting down the pressure of the reaction mixture leaving the reactor to the pressure within the first separation vessel.

In one embodiment of the present disclosure, the production line comprises a post reactor cooler downstream of the polymerization reactor for cooling the reaction mixture. The post reactor cooler can be arranged upstream of the pressure control valve or the post reactor cooler can be arranged downstream of the pressure control valve. In certain embodiments, the post reactor cooler is arranged downstream of the pressure control valve. The post reactor cooler may be composed of tubes of a length from 5 m to 25 m, such as 10 m to 22 m and from 15 m to 20 m. The individual tubes of the tubular reactor are, in further embodiments, flanged together. The tube can also be flanged to a bend, such as to a 180° bend. Such 180° bends may have a small radius, i.e. a ratio R/do of 4 or less. In one embodiment of the present disclosure, the flanges are arranged such that groups of flanges are aligned on top of each other. Such a group of flanges arranged one atop of the other may have at least two flanges, such as 3 to 80 flanges and 5 to 60 flanges.

The polymeric components obtained by the polymerization are finally transformed into pellets, normally by apparatuses like extruders or granulators.

FIG. 1 shows schematically a set-up of a production line for polymerizing ethylenically unsaturated monomers in a production line comprising a continuously operated tubular polymerization reactor.

The fresh ethylene, which may be under a pressure of 1.7 MPa, is initially compressed to a pressure of about 30 MPa by means of a primary compressor (1) and then may be compressed to the reaction pressure of about 300 MPa using a secondary compressor (2). Chain transfer agents (CTAs) may be added to primary compressor (1) together with the fresh ethylene. Comonomer may be added upstream of the secondary compressor (2) via line (3). The reaction mixture leaving the primary compressor (2) is fed to pre-heater (4), where the reaction mixture is preheated to the reaction start temperature of from about 120° C. to 220° C., and then conveyed to the inlet (5) of the tubular reactor (6).

The tubular reactor (6) may comprise a long, thick-walled pipe with cooling jackets to remove the liberated heat of reaction from the reaction mixture by means of a coolant circuit (not shown).

The tubular reactor (6) shown in FIG. 1 has four spatially separated initiator injection points (7a), (7b), (7c), and (7d) for feeding initiators or initiator mixtures PX1, PX2, PX3 and PX4 to the reactor and accordingly also four reaction zones. By feeding suitable free-radical initiators, which decompose at the temperature of the reaction mixture, to the tubular reactor, the polymerization reaction starts.

The reaction mixture leaves the tubular reactor (6) through pressure control valve (8) and passes a post reactor cooler (9). Thereafter, the resulting polymer is separated from unreacted ethylene and other low molecular weight compounds (monomers, oligomers, polymers, additives, solvent, etc.) by means of a first separation vessel (10) and a second separation vessel (11), discharged and pelletized via an extruder and granulator (12).

The ethylene and comonomers which have been separated off in the first separation vessel (10) are fed back to the inlet end of the tube reactor (6) in the high-pressure circuit (13) at 30 MPa. In the high-pressure circuit (13), the gaseous material separated from the reaction mixture is first freed from other constituents in at least one purification stage and then added to the monomer stream between primary compressor (1) and secondary compressor (2). FIG. 1 shows one purification stage consisting of a heat exchanger (14) and a separator (15). It is however also possible to use a plurality of purification stages. The high-pressure circuit (13) may separate waxes in certain embodiments.

The ethylene which has been separated off in the second separation vessel (11), which further comprises, inter alia, the major part of the low molecular weight products of the polymerization (oligomers) and the solvent, is worked up in the low-pressure circuit (16) at an absolute pressure of from about 0.1 to 0.5 MPa in a plurality of separators with a heat exchanger being installed between each of the separators. FIG. 1 shows two purification stages consisting of heat exchangers (17) and (19) and separators (18) and (20). It is, however, also possible to use only one purification stages or more than two purification stages. The low-pressure circuit (16) may separate resulting oils and waxes.

The ethylene which has passed the low-pressure circuit (16) is fed to a booster compressor (21) for being compressed to a pressure of about 4 MPa and then conveyed to primary compressor (1). Booster compressor (21) and primary compressor (1) may be part of one low-pressure compressor, i.e. of one apparatus powered by one motor. The gas mixtures compressed in the individual stages of the booster compressor (21), the primary compressor (1) and the secondary compressor (2) are cooled after every stage by heat exchanges (22), (23), (24), (25), (26), (27), and (28).

Different configurations for suitable tubular polymerization reactor are of course also possible. In some embodiments, it can be advantageous to add the monomers not only at the inlet of the reactor tube but to feed the monomers, including cooled monomers, at a plurality of different points to the reactor. This can be done at the beginning of further reaction zones and if oxygen or air is used as an initiator, which may be added to the monomer feed in the primary compressor.

The process of the present disclosure is characterized in that at least one of the pre-heater or pre-cooler, the polymerization reactor and the post reactor cooler is composed of tubes of a length from 5 m to 25 m which are flanged together, either directly or via bends, and the flanges are covered by a chimney construction, and air is conveyed through the chimney construction and the air exiting the chimney construction is monitored with respect to the hydrocarbons concentration.

In one embodiment of the present disclosure, the polymerization reactor is a tubular reactor or a reactor cascade comprising a tubular reactor and the production line comprises a pre-heater and a post reactor cooler, and the pre-heater, the polymerization reactor and the post reactor cooler are composed of tubes of a length from 5 m to 25 m which are flanged together, either directly or via bends, and the flanges are covered by a chimney construction, and air is conveyed through the chimney construction and the air exiting the chimney construction is monitored with respect to the hydrocarbons concentration.

In another embodiment of the present disclosure, the polymerization reactor is an autoclave reactor or a cascade of autoclave reactors and the production line comprises a pre-cooler or a post reactor cooler or a pre-cooler and a post reactor cooler, and the pre-cooler or the post reactor cooler or the pre-cooler and the post reactor cooler are composed of tubes of a length from 5 m to 25 m which are flanged together, either directly or via bends, and the flanges are covered by a chimney construction, and air is conveyed through the chimney construction and the air exiting the chimney construction is monitored with respect to the hydrocarbons concentration.

In some embodiments, all flanges of the production line are covered by a chimney construction. It is possible that each of the flanges is covered by a separate chimney construction. In certain embodiments, at least 50% of the chimney constructions cover two or more flanges and each chimney construction covers two or more flanges. In further embodiments, each chimney construction covers from 2 to 100 flanges, such as from 3 to 80 flanges and from 5 to 60 flanges. In some embodiments, a group of flanges, which are arranged one atop of the other, is covered by one chimney construction. The chimney construction, in certain embodiments, is vertically orientated with openings at the bottom and at the top and the air, which is heated by the hot flanges, can rise by natural convention and exit the chimney construction at the top. It is also possible that one chimney construction has two or more "legs" which cover groups of vertically arranged flanges and, above the highest of the covered the flanges, the "legs" converge to one chimney.

The chimney construction can have any form that encloses the flanges and allows transportation of gas through the construction. In some embodiments, the chimneys of the chimney construction are closed structures; however, it is also possible that the chimney construction has not only one opening for the air to enter and one opening for the air to exit the chimney construction but the chimney construction is also not closed at one side, for example has a U-shape and is open to an adjacent wall if the flanges are arranged close to this wall.

As the flanges of the production line have a higher temperature than the air coming from the environment, the air is heated and rises by natural convection. The earlier leaked gas reaches a detector the shorter is the time period for detecting a leakage. In one embodiment of the present disclosure, the walls of the chimney construction are isolated in order to minimize heat losses to the exterior and maximize the uprising velocity of the air.

A further possibility to convey gas through a closed structure is to use fans or blowers. This allows building chimney constructions which are not vertically oriented. However, natural convection or natural convection in combination with fans or blowers may be employed to convey the air through the chimney constructions and the chimney constructions is vertically oriented. When using fans or blowers for conveying the air or supporting the natural convection, conditions where the amount of air blown through the chimney constructions is so large that leaked gas is so diluted that the concentration remains below the detection limit should be avoided.

Figure 2:
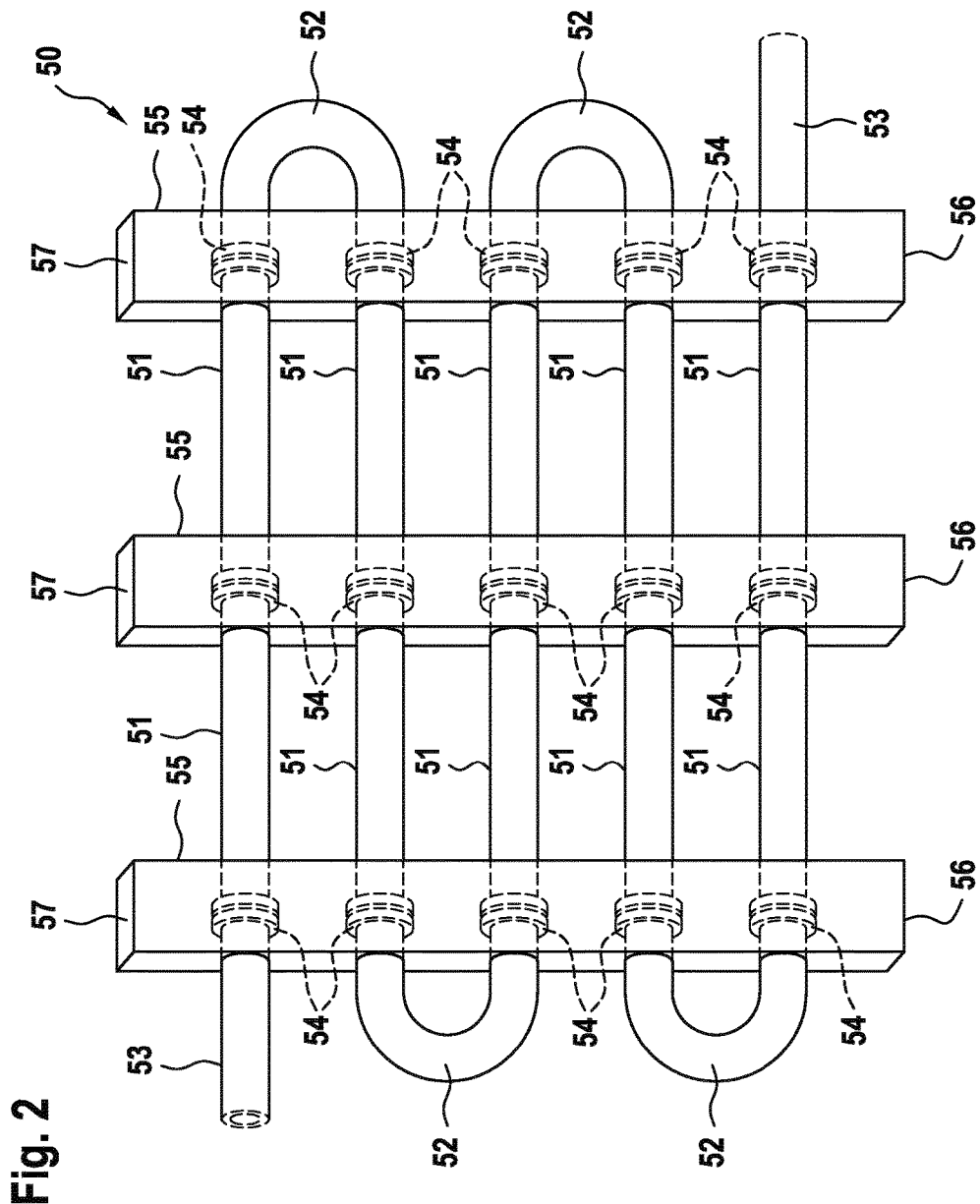
FIG. 2 shows schematically an arrangement of chimney constructions in a section of a tubular reactor.

FIG. 2 shows an arrangement of chimney constructions in which in a section (50) of a tubular reactor, five pairs of tubes (51) are arranged on top of each other and connected by bends (52). This section (50) of the tubular reactor is connected with other parts of the reactor by tubes (53). The flanges (54) are arranged on top of each other and covered by three chimney constructions (55) which are open at the bottom (56) and at the top (57) and in which air is conveyed by natural convection and exits the chimney constructions (55) at the top (57).

The chimney construction has the purpose to guide leaked gas to a gas detection system and to minimize the dilution of the leaked gas cloud. Thus, the less space there is between the flanges and the chimney walls, the higher the concentration of ethylene is in the uprising air. A high concentration of the gas to be detect is favorable because a detection threshold will be surpassed more quickly than for a more diluted gas cloud. Therefore, a chimney design matching the flanges quite closely without obstructing the upward flow is used in some embodiments.

Figure 3:
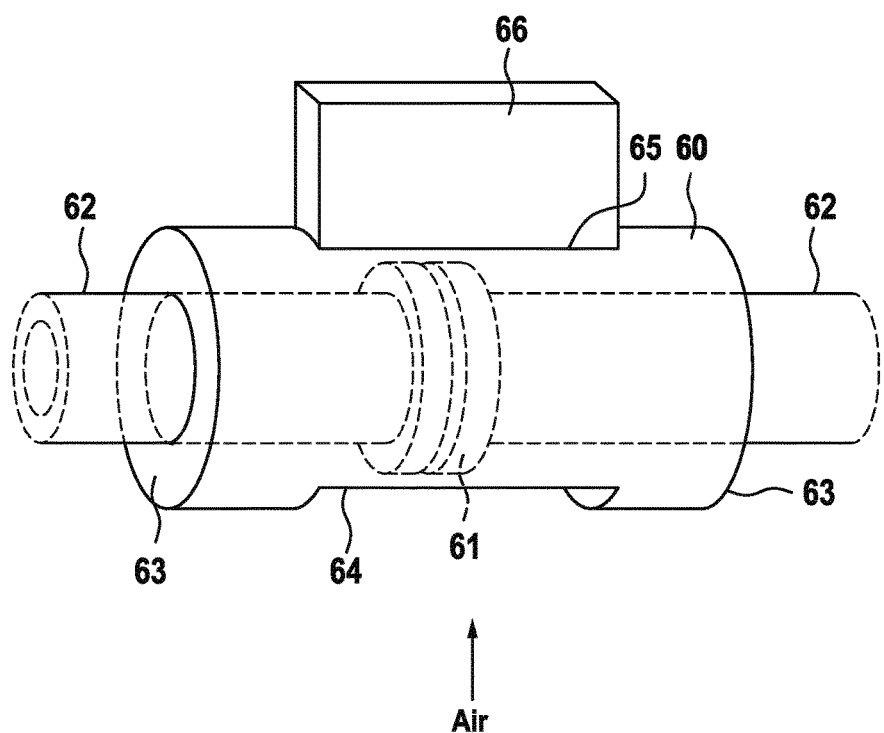
FIG. 3 shows schematically a chimney construction element covering one flange of a tubular reactor.

FIG. 3 shows a non-limiting design of a chimney constructions element (60) for one flange with a minimized internal volume. Chimney construction element (60) has a cylindrical form and covers a flange (61) for connecting two tubes (62). Chimney construction element (60) has two side walls (63) which each have a round opening of the diameter of the tubes (62) for the tubes (62) to pass. Chimney construction element (60) has a rectangular opening (64) at the bottom and a rectangular opening (65) at the top. Chimney construction element (60) can by connected to identical constructions elements arranged on top or below by rectangular connection elements (66) fitting into openings (64) and (65). Air can enter the chimney construction element (60) from below, leaves the chimney construction element (60) through opening (64) and can convey by natural convection through connection elements (66) into further chimney constructions elements possibly installed above.

The monitoring of the air exiting the chimney construction can be carried out with all suitable detectors for detecting hydrocarbons. In some embodiments, the air exiting the chimney construction is monitored by IR detectors such as IR point detectors or IR open-path detectors.

IR detectors are spectroscopic sensors which may be used as gas detectors. IR detectors operate on the principle that infrared (IR) radiation of a certain wavelength is differently absorbed by different materials such as different gases. Hydrocarbon gases can be monitored by IR measurement because of a strong IR absorption at wavelengths in the range from 3000 to 2750 $cm^{-1}$. IR detectors commonly include an infrared source (lamp), an optical filter which selectively transmits IR radiation of different wavelengths and an infrared detector. IR radiation of a wavelength which is specific for the material to be detected is directed through a sample towards the detector, which measures the attenuation, typically with respect to a reference beam without absorption. Such IR detectors are frequently used to measure gas concentrations. For detecting combustible gases, two types of IR detectors are commonly employed, IR point detectors and IR open-path detectors. IR point detectors measure the attenuation of IR radiation within a sample chamber which is located within the IR point detector. IR open-path detectors have separated infrared source and detector and the beam of IR radiation travels typically from a few meters up to a few hundred meters before reaching the IR detector.

For monitoring the air exiting the chimney construction with respect to the hydrocarbons concentration, the air may be monitored by one or more IR open path detectors or by an IR point detector.

When using IR open path detectors for monitoring the air exiting the chimney construction, it is possible that each chimney construction is equipped with one or more IR open path detectors designated for monitoring only air exiting one chimney construction. In some embodiments, the IR open path detectors are arranged in a way that each IR open path detector monitors air exiting more than one chimney construction. In further embodiments, the IR open path detectors are arranged in a matrix array in which at least 50% of the IR open path detectors monitor air exiting two or more chimney constructions and each stream of air exiting a chimney construction is monitored by at least three IR open path detectors. This allows for operating the IR open path detectors which monitor one chimney construction according to a voting logic.

Operating a group of IR detectors according to a voting logic means in the context of the present disclosure that for having a confirmed detection of hydrocarbons, at least a predefined number of IR detectors of the respective group of IR detectors has to detect hydrocarbons. In some embodiments, this predefined number is two. That means for a group of IR detectors having two detectors that both IR detectors have to detect the presence of hydrocarbons in order to have a confirmed detection of hydrocarbons; such a group operates consequently according to a two out of two (2oo2) logic. For a group of IR point detectors operating according to a 2oo2 logic, the IR point detectors may be arranged close to each other in a way that the distance between the two IR point detectors is, at most, 3 meters. For a group of IR detectors having three detectors, this means that at least two of the three IR detectors have to detect the presence of hydrocarbons in order to have a confirmed detection of hydrocarbons; such a group operates consequently according to a two out of three (2oo3) logic. For a group of IR detectors having N detectors, this means that at least two of N IR detectors have to detect the presence of hydrocarbons in order to have a confirmed detection of hydrocarbons; and the group operates consequently according to a two out of N (2ooN) logic. In case of larger groups of IR point detectors, it is further possible to operate with a 3ooN, a 400N or a XooN logic.

Employing IR open path detectors for monitoring the air exiting the chimney construction allows for a high probable that a leakage is detected even if the chimney is damaged, for example, by a large leak with gas escaping at a high velocity. This is because the IR open path detectors not only measure the areas above the exits of the chimney constructions but along the whole detection path and a large gas cloud coming from a damaged chimney construction has a high probability of crossing such path.

Another option for monitoring the air exiting a chimney construction is employing an IR point detector. In some embodiments, the IR point detector is supplied by an aspiration line with air coming from a location close to the opening through which the air exits the chimney construction. An aspiration line is equipment which allows conveying air from a specific position to a detector such as an IR point detector. In further embodiments, the air is conveyed through the aspiration line by an ejector or any other kinds of capable pumps. It is also possible to employ one IR point detector for monitoring two or more chimney construction. It is possible to combine two or more aspiration lines and monitor the combined air with respect to the hydrocarbons concentration. It is further possible to monitor the air coming from two or more aspiration lines subsequently. Then a multiplexer can be used which switches in a predefined intervals between the aspiration lines coming from different chimneys constructions. Employing an aspiration line for supplying the IR point detector with air coming from the chimney construction has the advantage that air is cooled down before arriving at the IR point detector. In one embodiment of the present disclosure, the aspiration lines are equipped with water traps for removing water, which may have been introduced by condensation or cooling water leakage, from the air before arriving at the IR point detector.

The monitoring of the air exiting the chimney construction with respect to the hydrocarbons concentration is carried out in order to detect the presence of hydrocarbons in this air after the occurrence of a leakage through one of the flanges. Detecting the presence of hydrocarbons means in the context of the present disclosure that the measured concentration of hydrocarbons rises above a pre-defined threshold value. Such threshold value can be a certain proportion of the lower explosive limit (LEL), i.e. the lowest concentration of a gas or a vapor in air capable of producing a flash of fire in presence of an ignition source. In some embodiments, a threshold value can be 20% LEL. That means for a group of IR point detectors operating according to a 2ooN voting logic, the detection of hydrocarbons is confirmed when the second IR point detector of the group of IR point detectors measures a hydrocarbon concentration above 20% LEL.

When detecting the presence of hydrocarbons in air exiting one of the chimney constructions, one possible reaction can be to give an alarm. In one embodiment, an emergency pressure release program is automatically started when hydrocarbons are detected in the air exiting the chimney construction. The emergency pressure release program may be a pre-implemented procedure in which the whole polymerization plant or only parts of the polymerization plant are depressurized or partly depressurized and the polymerization process is interrupted. For releasing the content of the reactor including pre-heater and post reactor cooler and the content of the secondary compressor including high-pressure gas recycle line and high-pressure product separator to the atmosphere, the production line is equipped with one or more emergency pressure release valves. These emergency pressure release valves may be installed along a tubular reactor or in the high-pressure gas recycle line or both along a tubular reactor and in the high-pressure gas recycle line. The depressurization of the polymerization reactor can occur via the one or more emergency pressure release valves or via the pressure control valve or a combination of emergency pressure release valves and pressure control valve. In certain embodiments, the depressurization of the polymerization reactor occurs via the one or more emergency pressure release valves.

In an embodiment of the present disclosure, the polymerization reactor and optionally further parts of the production line are installed within a protective enclosure. Such a protective enclosure, which may be constructed from concrete and which may be designated as "reactor bay", surrounds the polymerization reactor and other parts of the production line which are subjected to a high pressure for safety reasons. The protective enclosure protects the surrounding areas inter alia against overpressure, radiations and missile effects in case of the ignition of an accidental release of ethylene or other hydrocarbons. Such protective enclosures may be open to the sky. In one embodiment, not only the polymerization reactor but also the pressure control valve, the high-pressure product separator and, if present, the pre-heater or pre-cooler and the post reactor cooler are installed within the protective enclosure.

In one embodiment of the present disclosure, a water based deluge system is started automatically within the area enclosed by the protective enclosure when a leakage of monomers or of reaction mixture is detected. The water based deluge system provides to the enclosed area droplets having a diameter in a range from 25 μm to 20 mm with a minimum flow rate of 10 L/min per m$^2$ of enclosed area. That means the amount of liquid provided by these droplets having a diameter in the range from 25 μm to 20 mm is at least 10 L/min per m$^2$ of enclosed area. The water based deluge system may provide effective water droplets having a diameter in the range from 200 μm to 5 mm, or effective water droplets having a diameter in the range from 300 μm to 4 mm.

The minimum flow rate of the effective water droplets may be 14 L/min per m² of enclosed area, or 18 L/min per m² of enclosed area.

For achieving an even distribution of the droplets within the protective enclosure, the droplets are provided to at least 10% of the enclosed area, to at least 50% of the enclosed area, or to at least 90% of the enclosed area. The droplets may be created by spraying through at least 1 nozzle per 10 m² of enclosed area, through at least 3 nozzles per 10 m² of enclosed area, or through at least 5 nozzles per 10 m² of enclosed area, into the protective enclosure.

The diameter of the droplets provided to the area enclosed by the protective enclosure can for example be determined by laser-based disdrometers operating according to the extinction principle. For calculating the flow rate of droplets, the total liquid flow rate is determined and correlated with the relation of the generated volume of droplets to the volume of all droplets generated by spraying the liquid into the protective enclosure.

The curtain of droplets provided by the process of the present disclosure is able to effectively reduce the overpressure in case of an explosion. In the opinion of the present inventors, droplets having a diameter in the range from 25 μm to 200 μm, or in the range from 25 μm to 100 μm, may mitigate the effect of an explosion. These small droplets possess a large surface to volume ratio. Therefore these small droplets will immediately evaporate when being exposed to the temperature wave of the explosion. The evaporation of water consumes energy, which is thereby absorbed from the explosion and the hazardous potential is decreased. The overpressure within the protective enclosure and consequently the pressure acting on the enclosure walls are reduced.

Accordingly, to an embodiment of the present disclosure, droplets having a diameter in the range from 25 μm to 200 μm are generated and provided to the enclosed area. For fire protection in buildings, high-pressure water mist systems are available. These systems need a pressure generating device, e.g. a pump, for delivering water with a pressure of for example more than 3.5 MPa to specially designed nozzles. These nozzles are designed such that very small droplets are created, which may have diameters from 25 μm to 200 μm.

According to another embodiment of the present disclosure, droplets having a diameter in the range from 200 μm to 20 mm are provided to the enclosed area. The present inventors are of the opinion that also such droplets are able to mitigate the consequences of an explosion and to absorb the energy of the overpressures. In the case of an explosion, droplets of more than 200 μm in diameter are deformed by the pressure wave to such an extent that the droplets break up, whereby lots of small droplets with diameters smaller than 100 μm are created. These small droplets have then the capability of effectively mitigating the consequences of an explosion.

According to an embodiment of the present disclosure, the water based deluge system operates by providing water. Thus, water droplets having a diameter in the range from 25 μm to 20 mm are sprayed to the enclosed area. Operating the water based deluge system by spraying water allows for setting up the system in principle simply with a water connection. Furthermore, using water avoids any contamination of the production line with unwanted materials.

According to another embodiment of the present disclosure, the water based deluge system operates by providing a solution of radical capturing salts. Thus, droplets of such a solution having a diameter in the range from 25 μm to 20 mm are sprayed to the enclosed area. Examples of radical capturing salts are potassium bicarbonate, sodium bicarbonate, sodium chloride or sodium carbonate. The solution of radical capturing salts may be an aqueous solution of potassium bicarbonate or an aqueous solution of sodium bicarbonate. This allows that the solution can be supplied by standard systems for providing droplets and that upon evaporation of the water droplets due to an explosion, fine powders of the radical capturing salt are formed and has the two effects: a) the evaporation of the droplets takes out the heat of the explosion, thereby reducing the reaction rate of the radical chain reactions and b) the powder of the radical capturing salt is created, which further slows down the radical chain reactions. The size of the powder may be controlled by the size of the droplets by choosing adequate nozzles and the mass fraction of the radical capturing salt in the aqueous solution. Moreover, differently from employing a salt as fine powder, using a solution of a radical capturing salt avoids clumping which could reduce the effectivity because of an increased particle size or, in the worst case, a fully blocked dosing system.

In some embodiments, the minimum flow rate of the droplets is achieved not later than 30 seconds after detecting a leakage of monomers or of reaction mixture. In additional embodiments, the minimum flow rate of the effective water droplets is achieved not later than 20 seconds after detecting a leakage of monomers or of reaction mixture.

For establishing a fully developed spray pattern, the water based deluge system needs about 10 to 15 seconds in which water pressure is build-up in the pipings and the droplet curtain is formed. The water based deluge system may therefore be combined with a faster starting system for minimizing the probability that a leaked gas cloud explodes and the negative effects of explosions which may possibly occur. Such a faster starting system may comprise a steam based deluge system. Thus, according to one embodiment of the present disclosure, a steam based deluge system is started automatically in parallel with the water based deluge system.

The steam based deluge system can be operated by feeding steam having a pressure from 0.3 to 4 MPa, such as from 0.4 to 3 Mpa. After being injected into the protective enclosure, the pressurized water vapor will expand, replace oxygen containing air and dilute the possibly explosive gas cloud.

In some embodiments, the steam based deluge system is operated by feeding pressurized water having a temperature from 140° C. to 220° C., such as from 160° C. to 200° C., into the protective enclosure. As such pressurized water is above boiling point at atmospheric conditions, it will instantaneously evaporate when released.

In some embodiments, the steam based deluge system feeds pressurized water into the protective enclosure, which has been used as cooling medium for cooling the polymerization reactor by cooling jackets. Such water is available in sufficient quantities in a production line for the polymerization of ethylenically unsaturated monomers where the pressurized water is used for taking away the liberated heat of polymerization.

In one embodiment of the present disclosure, the pressurized water is provided by permanently circulating water having a temperature from 140° C. to 220° C. in a closed loop through a pipeline, which is installed from 2 to 20 m above the floor of the protective enclosure and which is equipped with nozzles for releasing the water when a leakage of monomers or of reaction mixture is detected. Such closed cycles may be installed in different heights, for example one loop at the a height of 2 m and one loop at a height of 6 m. Alternatively, pipings with connect the cooling jackets of the polymerization reactor could be provided with fast opening valves for releasing the cooling medium.

In a further embodiment of the present disclosure, the steam based deluge system is shut down 15 seconds after the water based deluge system has become fully active. In this context, having become fully active means that the water based deluge system provides droplets with the minimum flow rate for at least 20 seconds, including at least 15 seconds and at least 10 seconds, after the minimum flow rate has been reached. Shutting down the steam based deluge system after the water based deluge system has become fully active limits the amount of steam or hot pressurized water which needs to be kept ready and, if the pressurized water comes from the cooling system, saves resources for a timely restart of the production line.

According to one embodiment of the present disclosure, not only the air exiting the chimney construction is monitored with respect to the hydrocarbon concentration, but also further measurements for detecting a leakage of hydrocarbons in the surrounding of the production line are carried out. In certain embodiments, an emergency pressure release program is automatically started when hydrocarbons are detected in the air exiting the chimney construction or a leakage of hydrocarbons in the surrounding of the production line is detected by the further measurements.

The further measurements for detecting a leakage of hydrocarbons in the surrounding of the production line can be carried out by employing IR open path detectors, IR point detector or ultrasonic detectors, or combinations thereof.

Ultrasonic detectors are sensors which measure the sound which is emitted by leaking of pressurized gas. Such a noise can be created when the pressure difference between the pressured gas and the surrounding is more than 0.7 MPa. Ultrasonic detectors have the advantage that they are very fast as the measured signal travels by the speed of sound. However, ultrasonic sounds can also be created by other sources. Thus, according to one embodiment of the present disclosure, the IR detectors are employed for starting automatically the emergency pressure release program while the ultrasonic detectors are used to give an alarm signal. The ultrasonic detectors may however also be installed in a production line in a way that they reliably indicate leakage of combustible gases. Thus, according to another embodiment of the present disclosure, an emergency pressure release program is automatically started when an IR detectors detects the presence of hydrocarbons or an ultrasonic detector detects a gas leak. Ultrasonic detectors may be employed for monitoring the surrounding of the compressors or for monitoring non-jacketed pipelines such as supply lines for bringing ethylene to the production line.

According to a further embodiment of the present disclosure, the further measurements for detecting a leakage of hydrocarbons in the surrounding of the production line include a monitoring of at least one of the cooling media which cool the compression stage coolers, the cooling jackets of the polymerization reactor, the post reactor cooler or a cooler within the high-pressure or the low pressure gas recycle line is monitored with respect to an occurrence of a leakage of monomers or of reaction mixture into the cooling medium. In some embodiments, all these cooling media are monitored with respect to an occurrence of a leakage of monomers or of reaction mixture into the cooling medium.

In additional embodiments, the monitoring of the cooling medium occurs by passing air through the cooling medium and thereafter conveying the air to an IR point detector capable of detecting hydrocarbons.

As the solubility of ethylene in water is very low, leakages to the cooling medium will form small gas bubbles within the coolant stream. In some embodiments, the cooling medium system is designed in a way that such bubbles are collected in designated regions. For example, a horizontal coolant piping section is equipped with a T-fitting which is introduced in such a manner that one arm of the fitting points upwards so that gas bubbles will rise into this section. Cooling medium from such a region may be conveyed to equipment which allows passing air through the cooling medium, for example a small flash column. The air passing the cooling medium carries ethylene away from the cooling medium and a sample of the air is then led to an IR point detector. In one embodiment of the present disclosure, air sampling and monitoring are carried out redundantly, i.e. more than one an air sample is taken and each of these samples is conveyed to a different IR point detector. When the sampling is carried out redundantly, the IR point detectors for monitoring the air samples may operate according to a voting logic.

It is further possible to monitor the cooling medium of cooling systems which operate at ambient pressure by use of a fume hood construction above open parts of cooling systems such as open cooling medium return lines. The air above open part of the cooling system, which may comprise leaked ethylene, may be conveyed by natural convection to a detector. Depending on the dilution of the ethylene in the air, this detector can be an IR point detector or a Flame Ionisation Detector (FID).

In one embodiment of the present disclosure,
the polymerization reactor is a tubular reactor which is composed of tubes which are flanged together and each flanges is covered by a chimney construction and the air exiting the chimney construction is monitored with respect to the hydrocarbons concentration by one or more IR open path detectors or by an IR point detector which is supplied with air exiting the chimney construction;

the pre-heater, the polymerization reactor, the pressure control valve, the post reactor cooler and the high-pressure product separator are installed within a protective enclosure and the area within the protective enclosure is monitored by one or more IR point detectors, one or more IR open-path detectors or combinations thereof;

the surrounding of the compressors is monitored by one or more IR point detector, one or more ultrasonic detectors or combinations thereof;

the cooling media which cool the compression stage coolers, the cooling jackets of the polymerization reactor, the post reactor cooler and the coolers within the high-pressure gas recycle line are monitored by passing air is through the cooling medium and thereafter conveying the air to an IR point detector; and the pressure control valve is installed within a housing and the air within the housing is monitored with respect to the hydrocarbons concentration by an IR point detector which is supplied with air from within the housing by an aspiration line;

and an emergency pressure release program is automatically started when hydrocarbons are detected in the air exiting a chimney construction or a leakage of hydrocarbons in the surrounding of the production line is detected.

While multiple embodiments are disclosed, still other embodiments will become apparent to those skilled in the art from the following detailed description. As will be apparent, certain embodiments, as disclosed herein, are capable of modifications in various obvious aspects, all without departing from the spirit and scope of the claims as presented herein. Accordingly, the drawings and detailed description are to be regarded as illustrative in nature and not restrictive.

The invention claimed is:

1. A process for polymerizing or copolymerizing one or more ethylenically unsaturated monomers at temperatures from 100° C. to 350° C. and pressures in the range of from 110 MPa to 500 MPa in a continuously operated polymerization reactor, the process comprising carrying out polymerization or copolymerization in a production line in which the monomers are brought to a polymerization pressure by one or more compressors in a sequence of compression stages in which a compressed gas mixture is cooled after each compression stage by a compression stage cooler, compressed monomers are optionally passed through a pre-heater or a pre-cooler and transferred into the polymerization reactor, which is optionally cooled by cooling jackets, a reaction mixture obtained by polymerization is leaving the reactor through a pressure control valve, and optionally cooled by an post reactor cooler, the reaction mixture is separated into polymeric and gaseous components in two or more stages, where the gaseous components separated off in a first stage at an absolute pressure of from 15 MPa to 50 MPa are recycled to the one or more compressors via a high-pressure gas recycle line, and the gaseous components separated off in a second stage at an absolute pressure in the range of from 0.1 to 0.5 MPa are recycled to a first stage of the sequence of compression stages via a low-pressure gas recycle line, and the polymeric components obtained by the polymerization are transformed into pellets, wherein at least one of the pre-heater or pre-cooler, the polymerization reactor and the post reactor cooler is composed of tubes of a length from 5 m to 25 m which are flanged together, either directly or via bends, and the flanges are covered by a chimney construction, and wherein air is conveyed through the chimney construction and the air exiting the chimney construction is monitored with respect to hydrocarbons concentration.

2. The process of claim 1, wherein the polymerization reactor is a tubular reactor or a reactor cascade comprising a tubular reactor and the production line comprises a pre-heater and a post reactor cooler, and wherein the pre-heater, the polymerization reactor and the post reactor cooler are composed of tubes of a length from 5 m to 25 m which are flanged together, either directly or via bends, and the flanges are covered by a chimney construction, and wherein air is conveyed through the chimney construction and the air exiting the chimney construction is monitored with respect to the hydrocarbons concentration.

3. The process of claim 1, wherein the polymerization reactor is an autoclave reactor or a cascade of autoclave reactors, and the production line comprises a pre-cooler or a post reactor cooler or a pre-cooler and a post reactor cooler, and wherein the pre-cooler or the post reactor cooler or the pre-cooler and the post reactor cooler are composed of tubes of a length from 5 m to 25 m which are flanged together, either directly or via bends, and the flanges are covered by a chimney construction, and wherein air is conveyed through the chimney construction and the air exiting the chimney construction is monitored with respect to the hydrocarbons concentration.

4. The process of claim 1, wherein at least 50% of the chimney constructions covers two or more flanges.

5. The process of claim 1, wherein the chimney construction has openings at the bottom and at the top and the air is conveyed by natural convection.

6. The process of claim 1, wherein the air exiting the chimney construction is monitored by one or more IR open path detectors or by an IR point detector.

7. The process of claim 1, wherein the air exiting the chimney construction is monitored by an array of IR open path detectors which operate according to a voting logic.

8. The process of claim 1, wherein an emergency pressure release program is automatically started when hydrocarbons are detected in the air exiting the chimney construction.

9. The process of claim 1, wherein further measurements for detecting a leakage of hydrocarbons in a surrounding of the production line are carried out.

10. The process of claim 9, wherein an emergency pressure release program is automatically started when hydrocarbons are detected in the air exiting the chimney construction or a leakage of hydrocarbons in the surrounding of the production line is detected by the further measurements.

11. The process of claim 9, wherein the further measurements for detecting a leakage of hydrocarbons in the surrounding of the production line are carried out by employing IR open path detectors, IR point detector or ultrasonic detectors, or combinations thereof.

12. The process of claim 9, wherein the further measurements for detecting a leakage of hydrocarbons in the surrounding of the production line include a monitoring of at least one of the cooling medium which cools the compression stage coolers, the cooling jackets of the polymerization reactor, the post reactor cooler or a cooler within the high-pressure gas recycle line with respect to an occurrence of a leakage of monomers or of reaction mixture into the cooling medium.

13. The process of claim 12, wherein air is passed through the cooling medium and thereafter conveyed to an IR point detector capable of detecting hydrocarbons.

14. The process of claim 1, wherein the polymerization reactor and optionally further parts of the production line are installed within a protective enclosure and wherein a water based deluge system is started automatically in parallel with an emergency pressure release program and the water based deluge system provides droplets of a diameter in the range from 25 µm to 20 mm to an enclosed area when a leakage of monomers or of reaction mixture is detected and the droplets are provided with a minimum flow rate of 10 L/min per m² of enclosed area.

15. The process of claim 1, wherein a steam based deluge system is started automatically in parallel with an emergency pressure release program.

16. A process for polymerizing or copolymerizing one or more ethylenically unsaturated monomers at temperatures from 100° C. to 350° C. and pressures in the range of from 110 MPa to 500 MPa in a continuously operated polymerization reactor, wherein the polymerization is carried out in a production line in which the monomers are brought to a polymerization pressure by one or more compressors in a sequence of compression stages in which a compressed gas mixture is cooled after each compression stage by a compression stage cooler, compressed monomers are optionally passed through a pre-heater or a pre-cooler and transferred into the polymerization reactor, which is optionally cooled by cooling jackets, a reaction mixture obtained by a polymerization is leaving the reactor through a pressure control valve, and optionally cooled by an post reactor cooler, the reaction mixture is separated into polymeric and gaseous components in two or more stages, where the gaseous components separated off in a first stage at an absolute pressure of from 15 MPa to 50 MPa are recycled to the one or more compressors via a high-pressure gas recycle line, and the gaseous components separated off in a second stage at an absolute pressure in the range of from 0.1 to 0.5 MPa are recycled to a first stage of the sequence of compression stages via a low-pressure gas recycle line, and the polymeric components obtained by the polymerization are transformed into pellets, wherein at least one of the pre-heater or pre-cooler, the polymerization reactor and the post reactor cooler is composed of tubes of a length from 5 m to 25 m which are flanged together, either directly or via bends, and the flanges are covered by a chimney construction, and wherein air is conveyed through the chimney construction and the air exiting the chimney construction is monitored with respect to a hydrocarbon concentration and an emergency pressure release program is automatically started when hydrocarbons are detected in the air exiting the chimney construction, and wherein the air exiting the chimney construction is monitored by one or more IR open path detectors or by an IR point detector or the air exiting the chimney construction is monitored by an array of IR open path detectors which operate according to a voting logic.

17. The process of claim 16, wherein further measurements for detecting a leakage of hydrocarbons in a surrounding of the production line are carried out and an emergency pressure release program is automatically started when hydrocarbons are detected in the air exiting the chimney construction or a leakage of hydrocarbons in the surrounding of the production line is detected by the further measurements.

18. The process of claim 16, wherein the further measurements for detecting a leakage of hydrocarbons in a surrounding of the production line are carried out by employing IR open path detectors, IR point detector or ultrasonic detectors, or combinations thereof.

19. The process of claim 16, wherein the polymerization reactor and optionally further parts of the production line are installed within a protective enclosure and wherein a water based deluge system is started automatically in parallel with the emergency pressure release program and the water based deluge system provides droplets of a diameter in a range from 25 μm to 20 mm to an enclosed area when a leakage of monomers or reaction mixture is detected and the droplets are provided with a minimum flow rate of 10 L/min per m$^2$ of enclosed area.

20. The process of claim 19, wherein a steam based deluge system is started automatically in parallel with the emergency pressure release program.

* * * * *

UNITED STATES PATENT AND TRADEMARK OFFICE
CERTIFICATE OF CORRECTION

PATENT NO. : 10,358,510 B2
APPLICATION NO. : 16/300147
DATED : July 23, 2019
INVENTOR(S) : Gonioukh et al.

It is certified that error appears in the above-identified patent and that said Letters Patent is hereby corrected as shown below:

In the Specification

In Column 9, Line 53, after "operated in" insert -- a --
In Column 14, Line 16, delete "by" and insert -- be --, therefor
In Column 15, Line 30, delete "400N" and insert -- 4ooN --, therefor In the Claims In Column 22, Claim 4, Line 6, delete "constructions" and insert -- construction --, therefor Signed and Sealed this
Fifth Day of July, 2022

Katherine Kelly Vidal
*Director of the United States Patent and Trademark Office*